United States Patent [19]

Winnik et al.

[11] Patent Number: 5,378,574
[45] Date of Patent: Jan. 3, 1995

[54] INKS AND LIQUID DEVELOPERS CONTAINING COLORED SILICA PARTICLES

[75] Inventors: Francoise M. Winnik, Toronto; Barkev Keoshkerian, Thornhill; Raymond W. Wong, Mississauga; Stephan Drappel, Toronto; Melvin D. Crocher, Oakville; James D. Mayo, Toronto; Peter G. Hofstra, Guelph, all of Canada

[73] Assignee: Xerox Corporation, Stamford, Conn.

[21] Appl. No.: 369,003

[22] Filed: Jun. 23, 1989

Related U.S. Application Data

[63] Continuation-in-part of Ser. No. 232,967, Aug. 17, 1988, Pat. No. 4,877,451.

[51] Int. Cl.$^6$ .................................................. G03G 9/00
[52] U.S. Cl. ..................................... 430/115; 430/106; 430/114
[58] Field of Search ........................ 430/114, 115, 106

[56] References Cited

U.S. PATENT DOCUMENTS

| | | | |
|---|---|---|---|
| 3,290,105 | 12/1966 | Iannicelli | 106/308 |
| 3,290,165 | 12/1966 | Iannicelli | 106/308 |
| 3,834,924 | 9/1974 | Grillo | 106/308 N |
| 3,939,087 | 2/1976 | Vijayendran et al. | 252/62.11 |
| 4,179,537 | 12/1979 | Rykowski | 427/387 |
| 4,197,135 | 4/1980 | Bailey et al. | 106/23 |
| 4,204,871 | 5/1980 | Johnson et al. | 106/20 |
| 4,210,916 | 7/1980 | Mansakhani | 346/1.1 |
| 4,566,908 | 1/1986 | Nakatani et al. | 106/308 N |
| 4,576,888 | 3/1986 | Miyakawa et al. | 430/106 |
| 4,597,794 | 7/1986 | Ohta et al. | 106/20 |
| 4,685,968 | 8/1987 | Palmer | 106/23 |
| 4,689,078 | 8/1987 | Koike et al. | 106/22 |

FOREIGN PATENT DOCUMENTS

| | | |
|---|---|---|
| 3330380 | 5/1986 | Germany. |
| 0011853 | 1/1985 | Japan ................ 430/114 |

OTHER PUBLICATIONS

"Preparation and Analysis of Reactive Blue 2 Bonded to Silica Via Variable Spacer Groups", R. Ledger and E. Stellwagen, Journal of Chromatography, 299 (1984) 175–183.

Primary Examiner—Marion E. McCamish
Assistant Examiner—Steve Crossan
Attorney, Agent, or Firm—Judith L. Byorick

[57] ABSTRACT

Ink jet inks and liquid developers are disclosed which contain colored particles comprising hydrophilic silica particles, to the surfaces of which dyes are covalently bonded through silane coupling agents. The ink jet inks generally comprise a liquid medium and a plurality of the colored silica particles. The liquid developers generally comprise a liquid medium, a resin, a plurality of the colored silica particles, and a charge control agent. The particles are prepared by a process which comprises reacting hydrophilic silica particles with a silane coupling agent in the absence of water to form particles having covalently attached thereto coupling agents, followed by reacting a dye with the coupling agent attached to the silica particles.

48 Claims, No Drawings

INKS AND LIQUID DEVELOPERS CONTAINING COLORED SILICA PARTICLES

This application is a continuation-in-part of copending application U.S. Ser. No. 07/232,967 filed Aug. 17, 1988, now U.S. Pat. No. 4,877,451 entitled "Ink Jet Inks Containing Colored Silica Particles", the disclosure of which is totally incorporated herein by reference.

BACKGROUND OF THE INVENTION

The present invention is directed to compositions particularly suitable for electrophotographic and electrographic liquid development and for ink jet printing. More specifically, the present invention is directed to a process for preparing colored silica particles and to ink jet ink compositions and liquid developer compositions containing these particles. One embodiment of the present invention is directed to an ink jet ink composition comprising a liquid vehicle, a thickening agent, an optional conductivity enhancing agent, and a plurality of colored particles comprising hydrophilic silica particles to the surfaces of which dyes are covalently bonded through silane coupling agents. Another embodiment of the present invention is directed to a liquid developer composition which comprises a liquid medium, a polymeric material soluble in the liquid medium, a charge control agent, and a plurality of colored particles comprising hydrophilic silica particles to the surfaces of which dyes are covalently bonded through silane coupling agents. Still another embodiment of the present invention is directed to a liquid developer composition which comprises a liquid medium, a resin, a charge control agent, and a plurality of colored particles comprising hydrophilic silica particles to the surfaces of which dyes are covalently bonded through silane coupling agents. Yet another embodiment of the present invention is directed to an ink jet ink composition comprising water, a solvent, and hydrophilic silica particles having dyes covalently bonded to the particle surfaces through silane coupling agents. The colored silica particles in each composition can be prepared by reacting hydrophilic silica particles with a silane coupling agent in the absence of water to form silica particles with the coupling agents covalently bonded thereto, followed by reacting a dye with the coupling agent. Another embodiment of the present invention is directed to a process for generating images by ink jet processes with the ink compositions illustrated herein. Still another embodiment of the present invention is directed to a process for forming images and developing the images with the liquid developer compositions illustrated herein.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Development of electrostatic latent images with liquid developer compositions is also known. Liquid electrophotographic developers generally comprise a liquid vehicle in which is dispersed charged colored toner particles. In liquid development processes, the photoreceptor bearing the electrostatic latent image is transported through a bath of the liquid developer. Contact with the charged areas of the photoreceptor causes the charged toner particles present in the liquid vehicle to migrate through the liquid to the charged areas of the photoreceptor to develop the latent image. Thereafter, the photoreceptor is withdrawn from the liquid developer bath with the charged pigment particles adhering to the electrostatic latent image in image configuration. The developed image is then transferred to a suitable substrate, such as paper or transparency material, and, optionally, may be fixed to the substrate by heat, pressure, a combination of heat and pressure, or other suitable fixing means such as solvent or overcoating treatment.

In addition, liquid development of electrostatic latent images on charged papers is known. In these processes, the electrostatic latent image, which is usually formulated on a single sheet of dielectric paper, is transported through a bath of the liquid developer. Contact with the liquid developer causes the charged toner particles present in the liquid developer to migrate through the liquid vehicle to the dielectric paper in the configuration of the latent image. Thereafter, the sheet is withdrawn from the liquid developer bath with the charged toner particles adhering to the electrostatic latent image in image configuration. The thin film of residual developer remaining on the surface of the sheet is then evaporated within a relatively short time period, usually less than 5 seconds. Subsequently, the marking pigment particles may optionally be fixed to the sheet by any suitable method.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777; 4,251,824; 4,410,899; 4,412,224; and 4,532,530, the disclosures of each of which are totally incorporated herein by reference.

Another process for thermal ink jet printing entails selectively heating an ink in a reservoir with a series of heaters and with a slit situated on the surface facing the recording substrate. Activating the heaters in imagewise fashion results in the ink being selectively ejected from the slit in those areas where heat was applied, generally as a result of lowered viscosity of the ink in the area to which heat was applied. An electrode assist can be situated behind the printing substrate to attract a conductive ink to the substrate; ink is attracted from the slit to the substrate in areas to which heat has been applied, and the ink remains in the reservoir in areas to which heat has not been applied. This printing process is described in, for example, U.S. Pat. Nos. 4,751,531; 4,710,780; 4,751,533; 4,748,45; 4,737,803; and 4,580,148, the disclosures of each of which are totally incorporated herein by reference.

Ink jet inks are also known. For example, U.S. Pat. No. 4,197,135 discloses an ink with a pH of 8 or more for use in ink jet printers, which contains a water soluble dye and a polyamine containing 7 or more nitrogen atoms per molecule. In addition, U.S. Pat. No. 4,210,916 discloses an ink composition for use in jet printing comprising an aqueous solution of a water-soluble dye and a humectant consisting of at least one water-soluble alkene diol or alkene polyol compound. Further, U.S. Pat. No. 4,685,968 discloses a process for preparing an aqueous-based ink composition for use in ink jet printers, which comprises forming a solution of a dye having at least one negatively charged functional group per molecule, acidifying the solution, cycling the solution through a reverse osmosis membrane to form a concentrate and a permeate, the concentrate including a cation of the compound associated with at least one functional group on the dye and the permeate including a cation formerly associated with at least one functional group, adding water as necessary, concentrating the dye by reverse osmosis, and admixing the concentrated dye with at least one glycol ether. Another patent, U.S. 4,689,078, discloses a recording liquid suitable for ink jet recording comprising a liquid composition containing a disperse dye in which the purity of the disperse dye is 90 percent or higher.

Heterophase ink jet inks are also known. For example, U.S. Pat. No. 4,705,567 discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

In addition, processes for the production of colored silica particles are known. For example, U.S. Pat. No. 4,566,908 discloses an azoic pigment suitable for use in an electrophotographic toner having a silica core comprising a core of a fine powder of silica having a particle diameter of not more than 10 microns and a coating of a mono- or polyazoic dye chemically bound to the surface of the silica core through an aminosilane coupling agent. The process for preparing these colored silica particles is detailed at columns 8 to 18 of the patent. In addition, R. Ledger and E. Stellwagen, "Preparation and Analysis of Reactive Blue 2 Bonded to Silica Via Variable Spacer Groups," *Journal of Chromatography*, vol. 299, pages 175 to 183 (1984), discloses processes for preparing colored silica particles by covalently attaching Reactive Blue 2 dye to silica particles through various spacer groups. The disclosure of this article is totally incorporated herein by reference.

Further, colored polymeric particles having a dye covalently attached to the polymeric particles are illustrated in, for example, copending application U.S. Ser. No. 143,790, entitled "Process for Preparing Colored Particles and Liquid Developer Compositions Thereof". Processes for preparing silica based charge enhancing additives wherein a tetraalkoxysilane is reacted with an alcoholic alkaline solution in the presence of a soluble silica based charge enhancing additive are also disclosed in copending application U.S. Ser. No. 07/214,351, filed Jul. 1, 1988, entitled "Processes for the Preparation of Silica Containing Charge Enhancing Additives" with the named inventors Francoise M. Winnik and Yves Deslandes. Additionally, West German Patent Publication DE-3,330,380 discloses alkoxyaminosilanes which are chemically reacted with free silanol groups.

Of background interest are U.S. Pat. Nos. 2,876,119; 2,993,809; 3,939,087; 4,179,537; and 4,204,871.

Although the above described developers, ink jet inks, and processes for preparing colored silica are suitable for their intended purposes, a need continues to exist for heterophase ink jet inks that exhibit improved waterfastness, reduced feathering, and compatibility with plain paper. A need also exists for heterophase ink jet inks wherein the particles are thermally stable. Further, there is a need for ink jet inks available in a wide variety of colors. There is also a need for ink jet inks with reduced toxicity. In addition, a need continues to exist for simple and economical processes for preparing colored particles suitable for heterophase ink jet inks. A need also exists for liquid developer compositions available in a wide variety of colors. Further, there is a need for liquid developers wherein developers of different colors can be prepared with the same charge control agent. In addition, there is a need for liquid developers wherein the particle size and particle size distribution can be well controlled. There is also a need for liquid developers that afford excellent fixing characteristics to paper. Further, there is a need for recording liquids containing colorant particles with a high degree of transparency, thereby enhancing color quality and enabling the formation of high quality full color images by sequentially applying images of primary colors to a single substrate, each successive image being applied on top of the previous image.

SUMMARY OF THE INVENTION

It is an object of the present invention to provide heterophase ink jet inks that exhibit improved waterfastness, reduced feathering, and compatibility with plain paper.

It is still another object of the present invention to provide heterophase ink jet inks wherein the particles are thermally stable.

It is yet another object of the present invention to provide ink jet inks available in a wide variety of colors.

Another object of the present invention is to provide ink jet inks with reduced toxicity.

Still another object of the present invention is to provide simple and economical processes for preparing colored particles suitable as colorants for heterophase ink jet inks.

Yet another object of the present invention is to provide liquid developer compositions available in a wide variety of colors.

It is another object of the present invention to provide liquid developers of different colors, all containing the same charge control agent.

It is still another object of the present invention to provide liquid developers wherein the particle size and particle size distribution can be well controlled.

It is yet another object of the present invention to provide liquid developers that afford excellent fixing characteristics to paper.

Another object of the present invention is to provide recording liquids containing colorant particles with a high degree of transparency, thereby enhancing color quality and enabling the formation of high quality full color images by sequentially applying images of primary colors to a single substrate, each successive image being applied on top of the previous image.

These and other objects of the present invention are achieved by providing an ink composition suitable for ink jet printing comprising a liquid vehicle, a thickening agent, an optional conductivity enhancing agent, and a plurality of particles comprising hydrophilic silica particles wherein dyes are covalently bonded to the particle surface through silane coupling agents. The colored silica particles are prepared by a process comprising the reaction of hydrophilic porous silica particles with a silane coupling agent in the absence of water to form particles having covalently attached thereto coupling agents, followed by reaction of a dye with the coupling agent.

Another embodiment of the present invention resides in a liquid developer composition which comprises a liquid medium, a polymeric material soluble in the liquid medium, a charge control agent, and a plurality of colored particles comprising hydrophilic silica particles to the surfaces of which dyes are covalently bonded through silane coupling agents.

Still another embodiment of the present invention resides in a liquid developer suitable for the development of electrostatic latent images which comprises the colored silica particles formed by the process disclosed herein, a liquid medium, a charge control agent, and a resin.

Yet another embodiment of the present invention resides in an ink composition suitable for ink jet printing which comprises water, a solvent, and a plurality of particles comprising hydrophilic porous silica particles wherein dyes are covalently bonded to the particle surface through silane coupling agents.

The ink compositions and liquid developers of the present invention contain colored silicas prepared from hydrophilic silicas. Hydrophilic silicas are generally colorless, and possess surfaces covered with silanols that react with many functional groups to form covalent linkages. To effect coloration of these silicas, the silica is first reacted with a hydroxyalkyl silane or aminoalkyl silane coupling agent to attach the linking agent to the silica surface. Subsequently, a reactive dye is reacted with the linking agent to yield silica particles covalently attached to a dye through a coupling agent. The dye, being covalently bound to the coupling agent, is not subject to leaching or separating from the particles, which reduces or eliminates toxicity of the ink composition. A typical reaction sequence is shown schematically below:

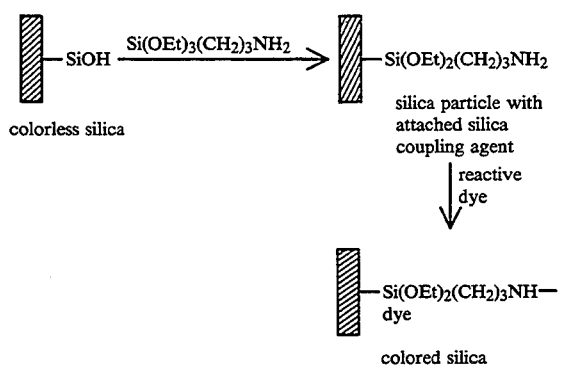

This reaction sequence illustrates the reaction of silica with 3-aminopropyltriethoxysilane to yield silica having covalently attached thereto a 3-aminopropyltriethoxysilane group, which is then reacted with a reactive dye to yield a silica particle having covalently attached thereto a 3-aminopropyltriethoxysilane group, to which is covalently attached a reactive dye.

Suitable silicas are hydrophilic in nature and include fumed silicas and silicas prepared by the sol-gel process. In general, the fumed silica particles are of the class prepared industrially at high temperatures by the reaction of tetrachlorosilane with hydrogen, oxygen, and water, as disclosed by E. Wagner and H. Brunner, *Angew. Chem.*, vol. 72, page 744 (1960), the disclosure of which is totally incorporated herein by reference. The particles have high surface areas of from about 130 to about 380 square meters per gram and primary particle sizes of from about 10 nanometers to about 20 nanometers. These primary particles cluster into aggregates ranging in size from about 50 to about 500 nanometers. Another type of suitable silica is that obtained by the sol-gel process, in which a soluble tetraalkoxysilane is treated with a base in a water/alcohol mixture, as described in W. Stöber, A. Fink, and E. Bohn, *J. Colloid. Int. Sci.*, vol. 20, page 62 (1968), the disclosure of which is totally incorporated herein by reference. The particles prepared by the sol-gel process are monodisperse in size, with average diameters ranging from about 40 nanometers to about 1 micron and surface areas ranging from 40 to 70 square meters per gram. Silica particle size remains essentially unchanged after the reactions with the coupling agent and the dye. Examples of suitable silicas include Aerosil ® 200, which has a surface area of 200 square meters per gram, and Aerosil ® 380, which has a surface area of 380 square meters per gram, both available from Degussa, Aerosil ® 90, Aerosil ® 130, Aerosil ® 150, Aerosil ® 300, Aerosil ® OX50, Aerosil ® TT600, Aerosil ® MOX 80, and Aerosil ® MOX 170, all available from Degussa, and Cabosil ® L90, Cabosii ® LM130, Cabosil ® LM5, Cabosil ® M-5, Cabosil ® PTG, Cabosil ® MS-55, Cabosil ® HS-5, and Cabosil ® EH-5, all available from Cabot Corporation. Prior to reaction with the coupling agents, the silica particles are treated to remove water by subjecting them to heating at 100° to 150° C. under vacuum for 24 hours and storing them in a dessicator.

Examples of suitable coupling agents include hydroxyalkyl silanes and aminoalkyl silanes. Preferably, the alkyl portion of the coupling agent has from about 2 to about 10 carbon atoms, and most preferably is a propyl group or a butyl group. Also suitable are hydroxyalkylaryl silanes, aminoalkylaryl silanes, hydroxyaryl silanes, and aminoaryl silanes. Hydroxyalkyl silanes, aminoalkyl silanes, hydroxyalkylaryl silanes, aminoalkylaryl silanes, hydroxyaryl silanes, and aminoaryl silanes, as defined herein, also include substituted compounds with from 1 to 3 alkoxy substituent groups attached to the silane portion of the molecule. Examples of suitable coupling agents are aminopropyltriethoxysilane, N,N-(2'hydroxyethyl)-3-aminopropyltriethoxysilane, 4-aminobutyltriethoxysilane, (aminoethyl)-(aminomethyl)-phenethyltrimethoxysilane, N-(2-aminoethyl)-3-aminopropyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and the like.

Suitable dyes include those that are water-soluble and react rapidly and in high yield with hydroxyl or amino groups. Generally, suitable dyes for the present invention are of the class known as reactive dyes and widely used in the textile industry. The dyes comprise a chromophore soluble in water, such as an anthraquinone, a monoazo dye, a disazo dye, a phthalocyan.ine, an aza[1-8]annulene, a formazan copper complex, a triphenodioxazine, and the like, to which is covalently attached a reactive group, such as a dichlorotriazine, a monochlorotriazine, a dichloroquinoxaline, an aminoepoxide, a mono-(m'-carboxypyridinium)triazine, a 2,4,5-trihalogenopyrimidine, a 2,4-dichloropyrimidine, a 2,3-dichloroquinoxaline, a monofluorotriazine, a 4,5-dichloro-6-methyl-2-methylsulfonylpyrimidine, a 1,4-dichlorophthalazine, a chlorobenzothiazole, a sulfatoethylsulfone, a α-chloroethylsulfone, a 4,5-dichloro-6-pyridazone, an α-bromoacryloylamido, an α,β-dibromopropionylamido, and the like. Examples of suitable dyes include Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Baslien Red E-B, Basilen Red E-7B, Basilen Red M-5B, Basilen Blue E-R, Basilen Brilliant Blue P-3R, Baslien Black P-BR, Basilen Turquoise Blue P-GR, Basilen Turquoise M-2G, Basilen Turquoise E-G, and Baslien Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, and the like.

Generally, the colorless silica particles are first reacted with the silane coupling agent in the absence of water, followed by reaction of the coupling agent with the dye. A solution is prepared containing a solvent such as dry toluene, benzene, xylene, hexane, or other similar aromatic or aliphatic solvents, containing the coupling agent in a relative amount of from about 0.1 to about 10 weight percent, and preferably from about 2 to about 5 weight percent. The dry silica particles are then suspended in the solution in a relative amount of from about 0.1 to about 10 weight percent, and preferably from about 1 to about 5 weight percent, and the suspension is subsequently heated at reflux temperature, which generally is about 111° C., for 2 to 24 hours, and preferably from 4 to 8 hours. During the process, water generated by the reaction is removed by a Dean-Stark trap. The process yields silica particles having silane coupling agents covalently attached thereto. These particles are separated from the suspension by high speed centrifugation (over 10,000 r.p.m.) or filtration after the suspension has cooled to room temperature, and the particles are washed, first with toluene and then methanol, and dried. Dyeing of the particles is effected by suspending the particles in water in a relative amount of from about 0.1 to about 20 weight percent, and preferably from about 5 to about 10 weight percent, and then adding the dye in a relative amount of from about 0.5 to about 10 weight percent, preferably from about 1 to about 4 weight percent, and stirring at room temperature for about 4 to 48 hours and preferentially for about 6 to about 24 hours to yield colored silica particles. The colored particles generally comprise from about 65 to about 98, and preferably from about 90 to about 95 percent by weight of the silica, from about 1 to about 20, and preferably from about 5 to about 10 percent by weight of the coupling agent, and from about 1 to about 30, and preferably from about 5 to about 15 percent by weight of the dye. In general, the formed particles are from about 10 to about 500 nanometers in average particle diameter, and preferably are from about 20 to about 300 nanometers in average particle diameter, as determined by Brookhaven BI-90 Particle Sizer.

Particles thus formed can be incorporated into a liquid medium to form an ink suitable for ink jet printing. The liquid medium generally comprises water, which may be distilled water, in an amount of from about 40 to about 95 percent by weight, and a glycol, such as ethylene glycol, diethylene glycol, propylene glycol, mixtures thereof, and the like, present in an amount of from about 5 to about 60 percent by weight. Alternatively, the liquid medium may comprise water, preferably present in an amount of from about 80 to about 95 percent by weight, and a water-miscible solvent such as dimethylsulfoxide or sulfolane, preferably present in an amount of from about 5 to about 20 percent by weight. The liquid medium may also include a biocide, such as sorbitol and the like, present in an amount of from about 0.1 to about 1.0 percent by weight of the water/glycol liquid medium, surfactants such as sodium dodecyl sulfate, cetyl trimethylammonium chloride, Triton X-100, and the like, present in an amount of from about 0.1 to about 1.0 percent by weight of the water/glycol liquid medium, and/or dispersants such as polyethylene glycol-1500, poly-N-vinylpyrrolidone, Disperbyk BYK, Daxad 30S, Daxad 19, Solsperse 20,000, and the like, present in an amount of from about 0.1 to about 1.0 percent by weight of the water/glycol liquid medium. The colored silica particles are added to the liquid medium in an amount of from about 1 to about 10 percent by weight of the water/glycol liquid medium. Other additives may also be present, provided that the objectives of the present invention are achieved. Ink compositions of the present invention are prepared by dispersing the colored silica particles in water by methods such as, for example, mechanical stirring, ball milling, or sonication, after which the glycol and any other ingredients are added. The suspension thus obtained may be filtered through a 1 micron filter to remove particles exceeding 1 micron in size.

Ink compositions thus prepared are suitable for use in ink jet printing processes. Inks of the present invention may be incorporated into an ink jet printer, such as the Diablo C 150 I J printer, the Hewlett Packard Desk Jet printer, the Diablo C150 TIJ printer, and the like, and images may be generated onto substrates such as transparencies, plain paper, coated paper, cloth, and the like by ejecting droplets of the ink onto the substrate to form an image by ink jet printing processes described herein, such as continuous stream, piezoelectric drop-on-demand, bubble jet or thermal ink jet processes.

One embodiment of the present invention is directed to ink jet inks particularly suitable for ink jet printing processes as disclosed in, for example, U.S. Pat. Nos. 4,751,531; 4,710,780; 4,751,533; 4,748,458; 4,737,803; and 4,580,148, hereinafter referred to as "thermal slit jet printing." These inks generally comprise a liquid vehicle, a thickening agent, and the colored silica particles prepared as described herein. Optionally, the ink contains a conductivity enhancing agent.

The liquid vehicle of the thermal slit jet inks of the present invention generally comprises a colorless hydrocarbon with a low vapor pressure. Typically, the vapor pressure of the liquid vehicle is from about 0.01 to about 0.1 millimeter of mercury, with vapor pressures of from about 0.02 to about 0.08 millimeter of mercury being preferred. In addition, the liquid vehicle preferably exhibits a boiling point above the temperature applied to the ink to eject it from the slit. For example, if the temperature applied to eject the ink is about 150° C., the liquid vehicle preferably has a boiling point of at least 200° C. Examples of suitable hydrocarbon liquid vehicles include oils, such as Magiesol ® 60, available from Magie Oil Company, Isopar ® V and Norpar ® 215, available from Exxon Corporation, Paraflex HT-10 available from Gulf Inc., and the like. The liquid vehicle is generally present in the ink in an effective amount, generally from about 40 to about 96 percent by weight and preferably from about 40 to about 80 percent by weight.

The colored silica particles, prepared as described herein, are generally present in the thermal slit jet inks of the present invention in an effective amount, generally from about 3 to about 30 percent by weight, preferably from about 5 to about 20 percent by weight, and more preferably in an amount of about 8 percent by weight. The particles generally have an average particle diameter of from about 0.05 to about 2 microns, and preferably from about 0.1 to about 1.0 micron.

Also present in the thermal slit jet inks of the present invention is a thickening agent. The thickening agent and the other ink ingredients are selected so that the viscosity of the ink composition is relatively high, generally from about 40 to about 400 and preferably over 100 centipoise, at ambient temperatures, generally about 20 to 25° C., and relatively low, generally from about 1 to about 20° and preferably less than 5 centipoise, at the temperature to which the ink is heated to eject it from the slit. Examples of suitable thickening agents include polyisobutylene polymers with a molecular weight of from about 1,000 to about 30,000, such as Vistanex, available from Exxon Corporation; polybutenes, such as Parapol 700, Parapol-950, Parapol-1300, and Parapol 10,024, available from Chevron Chemical Company; alkylated polyvinyl pyrrolidones, such as Ganex V216, available from GAF; poly(styrene-bohydrogenated butadienes), such as Kraton G-107, available from Shell Chemical Company; polyisobutylene succinimides, such as OLOA 1200, available from Chevron Chemical Company; glycol rosins, such as Polypale Ester 10, available from Hercules Inc.; and the like, as well as mixtures thereof. The thickener is present in the ink in an effective amount, generally from about 1 to about 30 perent by weight, preferably from about 2 to about 20 percent by weight, and more preferably from about 5 to about 15 percent by weight. The amount of thickener present in the ink generally depends on the molecular weight of the thickener, with relatively high molecular weight thickeners being present in lesser amounts than relatively low molecular weight thickeners.

The thermal slit jet inks of the present invention can also contain a conductivity enhancing agent. Many thermal slit jet printing processes employ an electrical assist to eject the ink from the reservoir through the slit. The conductive ink is selectively heated to reduce its viscosity, and in the heated areas, an electrical field applied between the ink reservoir and an electrode situated behind the printing substrate attracts the ink to the substrate. In non-heated areas, the ink remains sufficiently viscous so that the applied field does not attract ink in those areas to the substrate. When the ink ingredients are not completely pure, they may contain impurities that can ionize in the liquid vehicle to an extent sufficient to render an additional conductivity enhancing agent unnecessary. In other instances, a conductivity enhancing agent is added to the ink to render it sufficiently conductive. Generally, the ink possesses a conductivity sufficient to enable it to be ejected from the ink reservoir through the slit in imagewise fashion upon heating and application of an electric field. Typically, the inks exhibit a conductivity of at least $10^{-10}$ (ohm-cm)$^{-1}$ or higher, and preferably exhibit a conductivity of at least $10^{-8}$ (ohm-cm)$^{-1}$ or higher. Examples of suitable conductivity enhancing agents include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. Preferred conductivity enhancing agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc; heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. When present, the conductivity enhancing agent generally is present in an effective amount, generally from about 0.01 to about 1.0 percent by weight, and preferably from about 0.05 to about 0.5 percent by weight of the ink.

Further, the thermal slit jet inks of the present invention can also contain a dispersing agent to disperse the silica particles in the nonpolar liquid vehicle. Suitable dispersing agents generally include molecules with a polar portion and a non-polar portion, such as the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. Preferred dispersing agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc; heptanoic acid; salts of barium, aluminum, cobalt, manganese, zinc, cerium, and zirconlure octoates; salts of barium, aluminum, zinc, copper, lead, and iron with stearic acid; iron naphthenate; acrylic copolymers, such as RCP 1257, available from E.I. Du Pont de Nemours and Company; and the like, as well as mixtures thereof.

The thermal slit jet inks of the present invention generally are prepared by mixing the ink ingredients and ball milling the mixture to obtain a colloidally stable dispersion of the colored silica particles in the liquid vehicle.

Thermal slit jet inks of the present invention are suitable for imaging processes wherein heat is applied in imagewise fashion to the ink in a reservoir with a slit opening, causing the ink to be ejected from the reservoir onto a substrate such as paper or transparency material in imagewise fashion in areas of the reservoir to which heat has been applied and the ink remains in the reservoir in areas in which heat has not been applied. Optionally, the ink is conductive and an electrical field is applied between the reservoir and the substrate so that the conductive ink is selectively attracted to the substrate in imagewise fashion in areas of the reservoir in which heat has been applied and the conductive ink remains in the reservoir in areas in which heat has not been applied.

Yet another embodiment of the present invention is directed to a liquid developer suitable for the development of electrostatic latent images which comprises the colored silica particles formed by the process disclosed herein, a liquid medium, a polymeric material soluble in the liquid medium, and a charge control agent. Typical liquid media are colorless, odorless, nontoxic and nonflammable, generally have flash points greater than 104° F., and include aliphatic hydrocarbons. The liquid medium typically may be any of several hydrocarbon liquids conventionally employed for liquid development processes, such as hydrocarbons, including high purity alkanes having from about 7 to about 18 carbon atoms, such as Norpar ® 12, Norpar ® 13, and Norpar ® 15, available from Exxon Corporation, and including isoparaffinic hydrocarbons such as Isopar ® G, H, L, and M, available from Exxon Corporation, Amsco ® 460 Solvent, Amsco ® OMS, available from American Mineral Spirits Company, Soltrol ®, available from Phillips Petroleum Company, Pagasol ®, available from Mobil Oil Corporation, Shellsol ®, available from Shell Oil Company, and the like. Isoparaffinic hydrocarbons are preferred liquid media, since they are colorless, environmentally safe, and possess a sufficiently high vapor pressure so that a thin film of the liquid evaporates from the contacting surface within seconds at ambient temperatures. Particularly preferred are Isopar ® G and Isopar ® L. Generally, the liquid medium is present in a large amount in the developer composition, and constitutes that percentage by weight of the developer not accounted for by the other components. The liquid medium is present in an effective amount, generally from about 75 to about 99.4 percent by weight, although this amount may vary from this range provided that the objectives of the present invention are achieved.

The colored silica particles can be prepared according to the method described herein, and are generally present in an amount of from about 0.1 to about 8 percent by weight of the developer, and preferably from about 0.8 to about 3 percent by weight of the developer. In this embodiment of the present invention, the colored silica particles generally have an average particle diameter of from about 0.05 to about 2 microns, and preferably from about 0.1 to about 0.8 micron. The particle diameter, however, may be outside of this range, provided that the objectives of the present invention are achieved.

The liquid developer preferably includes a charge control agent to give the colored silica particles charge in order for them to undergo electrophoresis in an electric field. Any suitable charge control agent selected from the well known agents for such purpose may be used. Useful charge control agents include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive generally is present in an amount of from about 0.001 to about 2 percent by weight, and preferably from about 0.01 to about 0.8 percent by weight of the developer composition.

The liquid developers of the present invention also contain a polymeric material soluble in the liquid medium. By soluble, it is meant that the polymeric material can be dissolved in the liquid medium in amounts of at least about 5 to about 10 percent by weight at the operating temperature of the liquid developer during development and at those temperatures to which the developer will be exposed during shipment and storage. Preferably, the polymeric material is soluble in the liquid medium at temperatures of about $-20°$ C. or lower, and also soluble at temperatures of about 70° C. or higher, as well as being soluble between these temperatures. This temperature range of from about $-20°$ C. to about 70° C. represents the temperatures to which it can be expected that a liquid developer might be exposed during shipment or storage; the polymer may exhibit solubility in the liquid medium within a narrower or broader temperature range, provided that the objectives of the present invention are achieved. Examples of suitable polymers for this embodiment of the present invention include poly(2-ethyl hexylmethacrylate); poly(isobutylene-co-isoprenes), such as Kalene 800, available from Hardman Company N.J.; polyvinyl toluene-based copolymers, including vinyl toluene acrylic copolymers such as Pliolite OMS, available from the Goodyear Tire and Rubber Company; block copolymers such as poly(styrene-b-hydrogenated butadiene), including Kraton G 1701, available from Shell Chemical Company; and the like, as well as mixtures thereof. The polymer becomes adsorbed onto the surfaces of the colored silica particles in the liquid developer by dispersion forces, and functions as a stabilizer to maintain distance between the colored silica particles and prevent agglomeration and precipitation of the particles in the developer. Generally, the polymer is present in the liquid developer in an amount of from about 0.5 to about 15 percent by weight, and preferably from about 1 to about 5 percent by weight.

The liquid developer generally can be prepared by heating and mixing the ingredients, followed by grinding the mixture in an attritor until homogeneity of the mixture has been achieved, generally for about one hour. Subsequently, the charge control agent is added to the mixture to yield the liquid developer. Subsequent to the preparation of this developer composition, the particles generally possess a charge to mass ratio of from about 50 to 2,000 microcoulombs per gram.

The liquid developers of this embodiment of the invention are useful in known imaging and printing processes. These liquid developers may be employed in imaging methods wherein an electrostatic latent image is formed on an imaging member, developed with the developer composition illustrated herein, transferred to a suitable substrate such as paper or transparency material, and thereafter optionally permanently affixed thereto. In addition, these liquid developers can be employed for direct printing processes, including, for example, the printing process employed by the Versatec ® V-80 printer. In direct or stylus writing printing processes, a paper sheet coated with a dielectric or electrically insulating polymer coating is placed between a series of styli situated near one surface of the paper and an electrode situated near the opposite surface of the paper. Generation of an electric field between the styli and the electrode results in electrical breakdown of the air between the styli and the paper, thereby generating ions that adhere to the paper. Thus, by generating an electrical field between specific styli and the electrode in imagewise fashion, ions are deposited on the paper in imagewise fashion to form an electrostatic latent image. The paper bearing the latent image is then contacted with the liquid developer of the present invention comprising a liquid medium, colored silica particles, a polymer soluble in the liquid medium, and a charge control agent, the particles in said developer having a charge opposite to that of the latent image, resulting in development of the latent image. Subsequently, the liquid medium evaporates from the paper and the colored particles adhere to the paper in imagewise fashion. Generally, fusing of the particles to the substrate is not necessary. Further information concerning direct or stylus writing printing processes is disclosed, for example, U.S. Pat. Nos. 2,919,171; 3,564,556; 3,693,185; 3,793,107; 3,829,185; 4,042,939; 3,729,123; 3,859,960; 3,937,177; 3,611,419; 4,569,584; 4,240,084; 4,524,371; and 4,322,469, the disclosures of each of which are totally incorporated herein by reference.

Another embodiment of the present invention resides in a liquid developer suitable for the development of electrostatic latent images which comprises a liquid medium, a charge control agent, and toner particles comprising the colored silica particles formed by the process disclosed herein and a resin. The liquid medium, colored silica particles, and charge control agent generally are as described herein for liquid developers. The resin generally is insoluble in the liquid medium at ambient temperature (generally from about 20° to about 30° C.) and can be either soluble or insoluble but fluid in the liquid vehicle at temperatures of from about 70° to about 120° C. Examples of suitable resins that are insoluble in the liquid vehicle at elevated temperatures include copolymers of ethylene and methacrylic acid or acrylic acid, such as Elvax II 5550, Elvax II 5610, Elvax II 5750T, Elvax II-5720, available from E. I. DuPont, copolymers of ethylene and vinyl acetate, such as those available as the Elvax ® resins from E. I. Du Pont de Nemours & Company, including Elvax I 420, Elvax I, Elvax I 310, Elvax I 210, Elvax I-250, methacrylate copolymers, such as Elvacite 2014, Elvacite 2013, Elvacite 2016, and Elvacite 2028 resins, available from E. I. Du Pont, and the like, as well as mixtures thereof. Suitable resins that are soluble in the liquid vehicle at elevated temperatures but insoluble at ambient temperature include polyolefins and halogenated polyolefins, including poly-α-olefins and chlorinated polypropylenes. Examples of suitable polyolefins include chlorinated polypropylene, such as that available from Eastman Kodak Company as CP-343-1, poly-α-olefins, such as polyhexadecene, including those of the general formula $(C_{16}H_{32})_x$, wherein x is a number of from about 250 to about 21,000, the number average molecular weight is from about 17,500 to about 1,500,000 as determined by GPC, and the $M_w/M_n$ dispersibility ratio is from about 2 to about 15, polyoctadecene, including those of the general formula $(C_{18}H_{36})_x$, wherein x is a number of from about 250 to about 21,000, the number average molecular weight is from about 17,500 to about 1,500,000 as determined by GPC, and the $M_w/M_n$ dispersibility ratio is from about 2 to about 15, and the like. Polyhexadecenes and polyoctadecenes suitable as resins for the liquid developers of the present invention may be prepared by, for example, the methods set forth in U. Giannini, G. Bruckner, E. Pellino, and A. Cassatta, *Journal of the Polymer Science*, Part C (22), pages 157 to 175 (1968), and in K. J. Clark, A. Turner Jones, and D. G. H. Sandiford, *Chemistry in Industry*, pages 2010 to 2012 (1962), the disclosures of each of these articles being totally incorporated herein by reference.

Liquid developers of this embodiment of the present invention generally can be prepared by mixing the resin particles and the liquid medium, for example in an attritor such as a Union Process 01 Attritor, available from Union Process Inc., Akron, Ohio, with heating at a temperature at or above the melting point of the resin, generally from about 80° to about 130° C., causing the resin to melt and form a resin/liquid medium mixture wherein the liquid medium functions as a diluent for the resin and lowers its viscosity. The liquid medium and resin generally are mixed for a period of from about 30 minutes to about 2 hours. Generally, the liquid medium is present in the mixture in an amount of from about 80 percent by weight to about 90 percent by weight, and preferably is present in a amount of from about 82 to about 94 percent by weight. Subsequently, the colored silica particles are added to the resin/liquid medium mixture at a temperature of from about 80° to about 130° C. in an amount of from about 5 to about 35 percent by weight of the resin, and preferably in an amount of from about 10 to 25 percent by weight of the resin.

After dispersion of the colored silica particles in the molten resin, the mixture obtained is cooled to ambient temperature over a period, for example, of from about 1 to about 6 hours, resulting in formation of toner particles with an average particle diameter of from about 1 to about 6 microns, wherein the resin has adsorbed onto the surfaces of the colored silica particles. The concentrated dispersion is then diluted with an additional amount of the liquid medium to form the liquid developer composition. Generally, the concentration of the toner particles in the hydrocarbon is from about 0.4 percent by weight to about 6 percent by weight and preferably from about 0.8 percent to about 2.0 percent by weight. Thereafter, a charge control agent is added to the dispersion formed to enable an electrophoretic liquid developer composition. The final developer generally comprises the liquid medium in an amount of from about 94 to about 99.6 percent by weight, preferably from about 97 to about 99.5 percent by weight, the toner particles in an amount of from about 0.4 to about 6 percent by weight, and preferably from about 0.8 to about 2.0 percent by weight, and the charge control agent in an amount of from about 0.01 to about 0.2 percent by weight, preferably from about 0.02 to about 0.2 percent by weight. Within the toner particles, the resin is generally present in an amount of from about 65 to about 95 percent by weight, and preferably from about 75 to about 90 percent by weight, and the colored silica particles are present in an amount of from about 5 to about 35 percent by weight, and preferably from about 10 to about 25 percent by weight. Generally, the charge to mass ratio of the toner particles in the developer is from about 50 to about 150 microcoulombs per gram, and preferably from about 70 to about 130 microcoulombs per gram.

The liquid developers of this embodiment of the invention are useful in known imaging and printing processes. These liquid developers may be employed in imaging methods wherein an electrostatic latent image is formed on an imaging member, developed with the developer composition illustrated herein, transferred to a suitable substrate, and thereafter permanently affixed thereto.

Liquid developers of the present invention have the advantage that several liquid developers, each of a different color, can be prepared having a common charge control agent. Thus, liquid developers of different colors could be employed in a single imaging apparatus with common plumbing. Within the imaging apparatus employing liquid development processes, liquid developers of different colors can be stored in separate developer storage containers, and are transported from the storage containers to the development station by tubing or hosing. When the developers of different colors employ different charge control agents, separate sets of tubing or hosing must be employed to transport each liquid developer to the development station to avoid contamination of the developer currently being transported with the charge control agent of a liquid developer previously transported; such contamination could alter the triboelectric charge on the particles of the developer currently being transported. When, as is possible with developers of the present invention, several liquid developers of different colors and with similar triboelectric charging characteristics and the same charge control agent are employed in an imaging apparatus, a single set of tubing or hosing can be used to transport each of the liquid developers from their storage containers to the development station, since contamination of one developer with the charge control agent from another is not a concern. Thus, the liquid developers of the present invention enable design of imaging apparatus employing liquid development and having simplified developer transportation systems and resulting reduced cost.

Specific embodiments of the invention will now be described in detail. These examples are intended to be illustrative, and the invention is not limited to the materials, conditions, or process parameters set forth in these embodiments. All parts and percentages are by weight unless otherwise indicated.

ATTACHMENT OF COUPLERS TO SILICA PARTICLES

EXAMPLE I

To 9.6 grams of Aerosil ® 200, which had been dried at 100° C. for 24 hours in a 500 milliliter round bottom flask equipped with a magnetic stirrer and a Dean-Stark trap, were added 300 milliliters of toluene, which had previously been dried by azeotropic distillation under nitrogen, and 2.96 grams of aminopropyltriethoxysilane. The resulting suspension was refluxed at 111° C. for 5 hours, cooled to room temperature, and centrifuged at about 10,000 r.p.m., after which the supernatant liquid was poured off and the precipitate washed with 500 milliliters of dichloromethane. Subsequently, the mixture of precipitate and dichloromethane was centrifuged, the supernatant was removed, and the residue was dried in a vacuum oven at about 200 mm Hg at 40° C. for 2.5 days to yield 9.6 grams (76% yield) of a white powdery material comprising Aerosil ® 200 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981), the disclosures of each of which are totally incorporated herein by reference.

EXAMPLE II

To 49.38 grams of Aerosil ® 380, which had been dried at 110° C. for 22 hours in a 1,000 milliliter round bottom flask equipped with a mechanical stirrer and a Dean-Stark trap, were added 900 milliliters of toluene, which had previously been dried by azeotropic distillation under nitrogen, and 61.5 milliliters of aminopropyltriethoxysilane. The reaction mixture was refluxed at 111° C. for 5 hours, cooled to room temperature, and centrifuged at about 3,000 r.p.m., after which the supernatant liquid was poured off and the precipitate washed with 500 milliliters of methanol. Subsequently, the mixture of precipitate and methanol was centrifuged twice, the supernatant was removed, and the residue was again washed with 500 milliliters of water and centrifuged twice. The residue was redispersed in water and freeze-dried to yield 29.4 grams (37.5% yield) of a white powdery material comprising Aerosil ® 380 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981).

EXAMPLE III

To 38.61 grams of Aerosil ® 380, which had been dried at 100° C. for 24 hours in a 2,000 milliliter round bottom flask equipped with a magnetic stirrer, a reflux condenser, and a thermometer, were added 800 milliliters of toluene, which had previously been dried by azeotropic distillation under nitrogen, and 96.1 milliliters of aminopropyltriethoxysilane. The reaction mixture was refluxed at 111° C. for 6 hours, cooled to room temperature, and filtered through a Whatman GFF/A filter paper. Subsequently, the solid was stirred in methanol for about 17 hours and refiltered, and the resulting solid was redispersed in methanol with a polytron and filtered a third time. The resulting solid was dried in a vacuum oven for 22 hours to yield 44.5 grams (75% yield) of a white powdery material comprising Aerosil ® 380 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981).

EXAMPLE IV

To 10 grams of Aerosil ® 380, which had been dried at 150° C. for 20 hours in a 500 milliliter round bottom flask equipped with a magnetic stirrer and a reflux condenser, were added 273 milliliters of ethanol and 26.5 milliliters of an ethanol solution containing 62 percent by weight of N,N-bis-(2-hydroxyethyl)aminopropyltriethoxysilane. The reaction mixture was refluxed at 111° C. for 20 hours, cooled to room temperature, and centrifuged at about 8,000 r.p.m., after which the supernatant liquid was poured off and the precipitate washed with 500 milliliters of ethanol and centrifuged. Subsequently, the residue was washed and centrifuged twice with water, and the residue was redispersed in water and freeze-dried to yield 6.6 grams (36.2% yield) of a white powdery material comprising Aerosil ® 380 particles having covalently attached thereto N,N-bis-(2- hydroxyethyl)aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981).

EXAMPLE V

To 19.86 grams of Aerosil ® 380, which had been dried at 100° C. for 24 hours in a 2,000 milliliter round bottom flask equipped with a mechanical stirrer, a thermometer, a reflux condenser, and a Dean-Stark trap, were added 500 milliliters of toluene, which had previously been dried by azeotropic distillation under nitrogen, and 52.5 milliliters of an ethanol solution containing 62 percent by weight of N,N-bis-(2-hydroxyethyl-)aminopropyltriethoxysilane. The reaction mixture was heated and the distillate in the Dean-Stark trap was discarded until the reaction mixture reached 111° C., after which the reaction mixture was refluxed at 111° C. for 6 hours and filtered with Whatman filter paper. The resulting precipitate was slurried in 500 milliliters of methanol, filtered with Whatman filters, and dried in vacuo at 120° C. for 24 hours to yield 21.87 grams of a white powdery material comprising Aerosil ® 380 particles having covalently attached thereto N,N-bis-(2-hydroxyethyl)aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981).

EXAMPLE VI

To a mixture of 730 milliliters of absolute ethanol and 36 milliliters of concentrated aqueous ammonium hydroxide in a 1,000 milliliter round bottom flask equipped with a magnetic stirrer and a thermometer was added 30 milliliters of tetraethoxysilane. The reaction vessel was capped immediately, and the reaction mixture was then stirred at room temperature for 24 hours. Thereafter, insoluble white particles formed which were separated by centrifugation at 15° C., 10,000 rpm for 10 minutes. Subsequently, the particles were resuspended in 500 milliliters of deionized water. The pH of this suspension was adjusted to 7.5 by addition of a few drops of concentrated hydrochloric acid. The particles were then washed repeatedly with deionized water by ultrafiltration with a Minitan Acrylic System from Millipore Inc. Subsequently, the suspension of purified particles was concentrated to approximately 300 milliliters and the particles were isolated from this suspension by freeze-drying for 48 hours. There resulted a fine white powder, 7.8 grams, 96 percent yield, which particles had an average diameter of 45 nanometers as determined by transmission electron microscopy. To 5 grams of the isolated particles, which had been dried at 100° C. for 24 hours, in a 2,000 milliliter round bottom flask equipped with a mechanical stirrer, a Dean Stark condenser, and a thermometer, were added 100 milliliters of toluene, which had previously been dried by azeotropic distillation under nitrogen, and 0.65 milliliters of aminopropyltriethoxysilane. The reaction mixture was refluxed at 111° C. for 6 hours, cooled to room temperature, and filtered through a Whatman GFF/A filter paper. Subsequently, the solid was stirred in methanol for about 17 hours and refiltered, and the resulting solid was redispersed in methanol and filtered a third time. The resulting solid was dried in a vacuum oven for 22 hours to yield 4.8 grams (75% yield) of a white powdery material comprising silica particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981), the disclosure of which is totally incorporated herein by reference.

COLORATION OF SILICA PARTICLES

EXAMPLE VII

A mixture of 1.0 gram of silica particles with attached couplers prepared according to the method of Example I and 1.0 gram of Levafix Brilliant Blue EFFA (available from Bayer) in 40 milliliters of water was stirred at room temperature for 18 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry TM freeze dryer, available from FTS ® Systems, Stone Ridge, N.Y., to yield 0.75 gram of blue silica particles.

EXAMPLE VIII

A mixture of 1.0 gram of silica particles with attached couplers prepared according to the method of Example I and 1.0 gram of Levafix Brilliant Red E6BA (available from Bayer) in 35 milliliters of water was stirred at room temperature for 18 hours in a round bottom flask equipped with a magnetic stirrer and was subsequently centrifuged. The residue was dispersed in water and centrifuged in water until the supernatant was colorless, after which the residue was redispersed in water and freeze-dried with a Dura-Dry TM freeze dryer, available from FTS ® Systems, Stone Ridge, N.Y., to yield 0.60 gram of red silica particles.

EXAMPLE IX

A mixture of 3.0 grams of silica particles with attached couplers prepared according to the method of Example II and 3.0 grams of Levafix Brilliant Red E6BA (available from Bayer) in 120 milliliters of water was stirred at room temperature for 22 hours in a round bottom flask equipped with a magnetic stirrer. Thereafter, the suspension was purified by ultrafiltration with a Minitan Acrylic system from Millipore Inc. until the supernatant was colorless. The suspension was concentrated to 20 milliliters and freeze-dried with a Dura-Dry TM freeze dryer, available from FTS ® Systems, Stone Ridge, N.Y., to yield 2.3 grams of red silica particles.

EXAMPLE X

A mixture of 1.0 gram of silica particles with attached couplers prepared according to the method of Example II and 2.0 grams of Procion Turquoise HA (available from ICI) in 50 milliliters of water was stirred at reflux temperature for 3.5 hours in a round bottom flask equipped with a magnetic stirrer and a condenser and was subsequently cooled to room temperature. Thereafter, the suspension was purified by ultrafiltration with a Minitan Acrylic system from Millipore Inc. until the supernatant was colorless. The suspension was concentrated to 20 milliliters and freeze-dried with a Dura-Dry TM freeze dryer, available from FTS ® Systems, Stone Ridge, N.Y., to yield 1.0 gram of cyan silica particles.

EXAMPLE XI

A mixture of 3.0 grams of silica particles with attached couplers prepared according to the method of Example II and 3.0 grams of Levafix Brilliant Blue EFFA (available from Bayer) in 120 milliliters of water was stirred at room temperature for 22 hours in a round bottom flask equipped with a magnetic stirrer. Thereafter, the suspension was purified by ultrafiltration with a Minitan Acrylic system from Millipore Inc. until the supernatant was colorless. The suspension was concentrated to 20 milliliters and freeze-dried with a Dura-Dry TM freeze dryer, available from FTS ® Systems, Stone Ridge, N.Y., to yield 2.4 grams of blue silica particles.

EXAMPLE XII

A mixture of 3.0 grams of silica particles with attached couplers prepared according to the method of Example III and 13.0 grams of Levafix Brilliant Blue EFFA (available from Bayer) in 300 milliliters of water was stirred at room temperature for 22 hours in a round bottom flask equipped with a magnetic stirrer. Thereafter, the suspension was purified by ultrafiltration with a Minitan Acrylic system from Millipore Inc. until the supernatant was colorless. The suspension was concentrated to 20 milliliters. The residue was dispersed in water and centrifuged in water until the supernatant was colorless, after which the residue was redispersed in water and freeze-dried with a Dura-Dry TM freeze dryer, available from FTS ® Systems, Stone Ridge, N.Y., to yield 2.2 grams of blue silica particles.

EXAMPLE XIII

To a mixture of 31.0 grams of silica particles with attached couplers prepared according to the method of Example III and dried at 100° C. for 17 hours and Levafix Brilliant Blue EFFA (available from Bayer, Inc.) was added one liter of water. The resulting mixture was ball milled at room temperature for 3 days and then filtered with Whatman filter paper. The resulting precipitate was washed with 1 liter of water and filtered with Whatman filter paper, after which the resulting solid was dispersed in water. This dispersion was dialyzed against water using a Spectrapor 4 membrane, available from Canlab, for about 3 days, at which time the water remained colorless. The suspension was then freeze-dried with a Dura-Dry TM freeze dryer, available from FTS ® Systems, Stone Ridge, N.Y., to yield 10 grams of blue silica particles.

EXAMPLE XIV

To a mixture of 5.0 grams of silica particles with attached couplers prepared according to the method of Example II and dried at 100° C. for 17 hours and 5.0 grams of Procion Yellow MX-8G (available from ICI) was added 200 milliliters of water. The suspension was stirred at 90° C. for 24 hours and then cooled to room temperature. Thereafter, the suspension was purified by ultrafiltration with a Minitan Acrylic System from Millipore Inc. until the supernatant was colorless. Subsequently, the suspension was concentrated to 20 milliliters and freeze-dried with a Dura-Dry TM freeze dryer, available from FTS ® Systems, Stone Ridge, N.Y., to yield 4.3 grams of yellow silica particles.

EXAMPLE XV

To a mixture of 2.0 grams of silica particles with attached couplers prepared according to the method of Example II and dried at 100° C. for 17 hours and 2.0 grams of Levafix Black EB (available from Bayer) was added 60 milliliters of water. The suspension was stirred at room temperature for 24 hours and was thereafter purified by ultrafiltration with a Minitan Acrylic System from Millipore Inc. until the supernatant was colorless. The suspension was then concentrated to 20 milliliters and freeze-dried with a Dura-Dry TM freeze dryer, available from FTS ® Systems, Stone Ridge, N.Y., to yield 1.9 grams of black silica particles.

EXAMPLE XVI

To a mixture of 3.0 grams of silica particles with attached couplers prepared according to the method of Example VI and dried at 100° C. for 17 hours and Procion Turquoise HA (available from ICI) was added 100 milliliters of water. The suspension was stirred at room temperature for 24 hours and was thereafter purified by ultrafiltration with a Minitan Acrylic System from Millipore Inc. until the supernatant was colorless. The suspension was then concentrated to 20 milliliters and freeze-dried with a Dura-Dry TM freeze dryer, available from FTS ® Systems, Stone Ridge, N.Y., to yield 2.8 grams of cyan silica particles.

PREPARATION AND TESTING OF AN INK JET INK

EXAMPLE XVII

Colorless silica particles were colored blue by the procedure described in Example XIII. The amount of dye attached to the silica surface was determined to be 40 percent by weight, as determined by measuring the UV/Visible absorption spectrum of the silica particles suspended in dimethyl sulfoxide (DMSO).

The blue silica particles were suspended in a mixture of water and DMSO (80/20 v/v) and jetted in a Diablo $C_{150}$ I J printer on coated paper FC3 from JuJo Paper and on Xerox ® 4024 plain paper. Prints of excellent edge acuity and color, and waterfastness of over 95 percent were obtained on both papers. Optical densities of the prints were 1.84 on coated paper and 1.10 on Xerox ® 4024 paper.

EXAMPLE XVIII

Colorless silica particles were colored blue by the procedure described in Example XIII. The amount of dye attached to the silica surface was determined to be 40 percent by weight, as determined by measuring the UV/Visible absorption spectrum of the silica particles suspended in DMSO. The blue silica particles were suspended in a mixture of water and ethylene glycol (95/5 v/v) in an amount such that the resulting ink had a colored silica concentration of 8 weight percent and jetted in a Diablo C150 I J printer on coated paper FC3 from JuJo Paper and on Xerox® 4024 plain paper. Prints of excellent edge acuity and color, and waterfastness of over 95 percent, were obtained on both papers. Optical densities of the prints were 1.67 on coated paper and 1.04 on Xerox® 4024 paper.

PREPARATION AND TESTING OF THERMAL SLIT JET INKS

EXAMPLE XIX

To Aerosil® 200 (101.5 grams, dried at 150° C. under vacuum for 24 hours and then cooled in a desiccator) in a 2 liter round bottom flask equipped with a mechanical stirrer, a thermometer, a reflux condenser, a Dean-Stark apparatus and a nitrogen inlet were added 1.0 liter of toluene and 62.9 grams (0.284 mole) of aminopropyltriethoxysilane. The reaction mixture was refluxed for 4.5 hours, cooled to room temperature, and filtered through a Whatman GF/A filter paper. The solid collected was slurried twice with toluene and twice with methanol, with filtrations being executed after each solvent treatment. Subsequently, the solid was dried at 60° C. in a vacuum oven for 24 hours to yield 105 grams of a white material comprising Aerosil® 200 particles having covalently attached thereto aminopropyltriethoxysilane groups.

Thereafter, 15 grams of the white solid thus obtained were suspended in 300 milliliters of deionized water, and 7.5 grams of Procion Turquoise H-4G were added. The resulting suspension was stirred magnetically at room temperature for 22 hours and was subsequently purified by ultrafiltration with a Minitan Acrylic system from Millipore Inc. (VVLP Minitan plates, 0.1 micron, 2 membranes). When the filtrate became very faint in color, the slurry was concentrated to 300 milliliters and freeze-dried to isolate the particles, yielding 14.1 grams of cyan silica particles.

Subsequently, 5.0 grams of the cyan particles thus prepared were added to a 125 milliliter plastic (Nalgene) bottle containing ¼ inch stainless steel balls. 5.0 Grams of an acrylic copolymer commercially available as RCP1257 from E. I. Du Pont de Nemours & Company, 20.0 grams of polyisobutylene (commercially available as Exxon Parapol 1300 from Exxon Corporation), and 50 grams of a hydrocarbon oil (commercially available as Magiesol 60 from Magie Oil Company) were added to the bottle. The contents of the bottle were ball milled for 24 hours to yield a dark blue ink comprising colloidally stabilized cyan silica particles in the hydrocarbon oil. The viscosity of the ink was 150 centipoise at room temperature and 5 centipoise at 150° C. The ink exhibited good thixotropic properties in that it did not seep from the slit during non-printing periods. Further, the ink had a conductivity of $10^{-10}(ohm\text{-}cm)^{-1}$ at 150° C. and $10^{-14}(ohm\text{-}cm)^{-1}$ at room temperature. Prints on FX-L plain paper, available from Fuji Xerox Corporation, were obtained by incorporating the ink into a thermal slit jet printer prototype operating at a frequency of 10 Hz and generating images. This prototype thermal slit jet printer had a slit length of 40 millimeters and a slit width of 50 microns, and the heaters were situated at a depth of 500 microns from the surface of the slit. Each heater was 50 microns wide and 100 microns long, and the heaters were situated 64 microns apart. The prototype was operated at a jetting temperature of 150° C. Images thus generated with the above ink were well fixed to the paper in that they were not removed when rubbed with human fingers.

EXAMPLE XX

An ink described was prepared as in Example XIX with the exception that 5.0 grams of the red colored silica prepared as described in Example IX was used instead of the cyan colored silica. The resulting red ink had a viscosity of 130 centipoise at room temperature and 4 centipoise at 150° C., and exhibited a conductivity of $10^{-10}(ohm\text{-}cm)^{-1}$ at 150° C. and $10^{-14}(ohm\text{-}cm)^{-1}$ at room temperature. The ink exhibited good thixotropic properties in that it did not seep from the slit during non-printing periods. Further, the ink had a conductivity of $10^{-10}(ohm\text{-}cm)^{-1}$ at 150° C. and $10^{-14}(ohm\text{-}cm)^{-1}$ at room temperature. Prints on FX-L plain paper, available from Fuji Xerox Corporation, were obtained by incorporating the ink into a thermal slit jet printer prototype operating at a frequency of 10 Hz and generating images. This prototype thermal slit jet printer had a slit length of 40 millimeters and a slit width of 50 microns, and the heaters were situated at a depth of 500 microns from the surface of the slit. Each heater was 50 microns wide and 100 microns long, and the heaters were situated 64 microns apart. The prototype was operated at a jetting temperature of 150° C. Images thus generated with the above ink were well fixed to the paper in that they were not removed when rubbed with human fingers.

EXAMPLE XXI 5.0 Grams of the cyan particles prepared as described in Example XIX were added to a 125 milliliter plastic (Nalgene) bottle containing ¼ inch stainless steel balls. Subsequently, 5.0 grams of a polymeric material commercially available as RCP1257 from E. I. Du Pont de Nemours & Company, 5.0 grams of OLOA 1200 (commercially available from Chevron Chemical Corporation), 20.0 grams of polyisobutylene (commercially available as Exxon Parapol 1300 from Exxon Corporation), and 50 grams of a hydrocarbon oil (commercially available as Magiesol 60 from Magie Oil Company) were added to the bottle. The contents of the bottle were ball-milled for 24 hours to yield a dark blue ink comprising colloidally stabilized cyan silica particles in the hydrocarbon oil. At room temperature, the viscosity of the ink was 125 centipoise and at 150° C. the viscosity of the ink was 3 centipoise. The ink exhibited good thixotropic properties in that it did not seep from the slit during non-printing periods. Further, the ink had a conductivity of $10^{-10}(ohm\text{-}cm)^{-1}$ at 150° C. and $10^{-14}(ohm\text{-}cm)^{-1}$ at room temperature. Prints on FX-L plain paper, available from Fuji Xerox Corporation, were obtained by incorporating the ink into a thermal slit jet printer prototype operating at a frequency of 10 Hz and generating images. This prototype thermal slit jet printer had a slit length of 40 millimeters and a slit width of 50 microns, and the heaters were situated at a depth of 500 microns from the surface of the slit. Each heater was 50 microns wide and 100 microns long, and the heaters were situated 64 microns apart. The prototype was operated at a jetting temperature of 150° C. Images thus generated with the above ink were well fixed to the paper in that they were not removed when rubbed with human fingers.

PREPARATION AND TESTING OF LIQUID DEVELOPERS

EXAMPLE XXII

Aerosil ® 380 (45.0 grams) silica particles were dried under vacuum at 150° C. for 24 hours and then cooled in a desiccator. The dried silica particles were placed in a 2,000 milliliter round bottom flask equipped with a mechanical stirrer, a reflux condenser, a thermometer, a Dean-Stark apparatus, and a nitrogen inlet, and there were then added to the flask 500 milliliters of toluene, which had previously been dried by azeotropic distillation under nitrogen, and 53.8 grams (0.243 mole) of aminopropyltriethoxysilane. The reaction mixture was refluxed at 111° C. for 4.5 hours, cooled to room temperature, and filtered through a Whatman GF/A filter paper. Subsequently, the solid was slurried once with toluene and once with methanol, and filtrations were executed after each solvent treatment. The resulting solid was dried in a vacuum oven at 60° C. for 24 hours to yield 61.7 grams (61.9% yield) of a white powdery material comprising Aerosil ® 380 particles having covalently attached thereto aminopropyltriethoxysilane groups.

A mixture of 5.0 grams of the silica particles with attached couplers and 5.0 grams of Levafix Brilliant Red EGBA (available from Bayer) in 100 milliliters of water was stirred at room temperature for 24 hours in a round bottom flask equipped with a magnetic stirrer. The reaction mixture was then purified by ultrafiltration with a Minitan Acrylic System from Millipore Inc. (VVLP Minitan plates, 0.1 micron, 4 membranes). When the filtrate became colorless, filtration was stopped, and the colored silica particles were isolated by freeze-drying with a Dura-Dry TM freeze dryer, available from FTS ® Systems, Stone Ridge, N.Y., to yield 4.7 grams of magenta silica particles.

To 100 milliliters of Isopar ® G were added 4.0 grams of the magenta silica particles and 2.0 grams of poly(2-ethyl hexyl methacrylate) (polymeric stabilizer) obtained from Polysciences Inc. The resulting mixture was attrited in a Union Process O1 Attritor for 6 hours. A stable colloidal dispersion was obtained of particles with an average diameter of 0.4 micron. The dispersion was diluted to 1 weight percent of particles by the addition of a further 300 milliliters of Isopar ® G. To 300 milliliters of the dispersion was then added 0.12 gram of 12 percent zirconium octoate obtained from Nuodex Canada Inc. After standing for 24 hours to allow the mixture to equilibrate, the resulting liquid developer was incorporated into a Versatec V-80 electrographic printer and images were generated and developed. Images with an optical density of 1.1 were obtained that were well fixed to the paper. The toner particles were positively charged and exhibited a charge to mass ratio of 300 microcoulombs per gram.

EXAMPLE XXIII

A liquid developer was prepared as described in Example XXII except that (0.2 gram of a 6 percent solution of iron naphthenate replaced the zirconium octoate. The charge to mass ratio of the developer was 280 microcoulombs per gram and the particles were positively charged. The imaging performance of this liquid developer in the Versatec V-80 printer were similar to those exhibited by the developer of Example XX.

EXAMPLE XXIV

The process of Example XXII was repeated with the exception that 5.0 grams of Procion Turquoise HA dye (available from ICI) replaced Levafix Brilliant Red EGBA in preparing the silica particles described in Example IX. A cyan liquid developer was obtained which exhibited a charge to mass ratio of 310 microcoulombs per gram with an average particle diameter of 0.4 micron. When the liquid developer was incorporated into a Versatec V-80 printer and employed to develop images on James River dielectric paper, cyan images with an optical density of 1.1 were obtained which were well fixed to the paper.

EXAMPLE XXV

The process of Example XXII was repeated with the exception that Procion Yellow MX-8G (available from ICI) was substituted for Levafix Brilliant Red EGBA, resulting in formation of a yellow liquid developer. The developer exhibited a charge to mass ratio of 270 microcoulombs per gram and the average particle diameter was 0.4 micron. When the liquid developer was incorporated into a Versatec V-80 printer and employed to develop images on James River dielectric paper, yellow images with an optical density of 0.7 were obtained which were well fixed to the paper.

EXAMPLE XXVI

Aerosil ® 380 (9.6 grams) silica particles were dried under vacuum at 100° C. for 24 hours and then cooled in a desiccator. The dried silica particles were placed in a 500 milliliter round bottom flask equipped with a mechanical stirrer, a reflux condenser, a thermometer, a Dean-Stark apparatus, and a nitrogen inlet, and there were then added to the flask 200 milliliters of toluene, which had previously been dried by azeotropic distillation under nitrogen, and 3.5 milliliters (0.0139 mole) of 3-aminopropyltriethoxysilane. The reaction mixture was refluxed at 111° C. for 5 hours, cooled to room temperature, and centrifuged at about 3,000 r.p.m., after which the supernatant liquid was poured off and the precipitate washed with 100 milliliters of methanol. Subsequently, the mixture of precipitate and methanol was centrifuged, the supernatant was removed, the residue was again washed with 100 milliliters of methanol and centrifuged, and the residue was then washed with 100 milliliters of water and centrifuged. The residue was dried under vacuum at 40° C. for 2 days to yield 6 grams of a white powdery material comprising Aerosil ®380 particles having covalently attached thereto aminopropyltriethoxysilane groups, as determined by the techniques described by M. W. Urban and J. L. Koenig in "Determination of the Orientation of Silanes on Silica Surfaces by Fourier Transform Infrared Photoacoustic Spectroscopy," *Applied Spectroscopy*, Vol 40, no. 4, pages 513 to 519 (1986) and T. G. Waddell, D. E. Layden, and M. T. DeBello in "The Nature of Organosilane to Silica Surface Bonding," *Journal of the American Chemical Society*, Vol. 103, pages 5303 to 5307 (1981).

A mixture of 25 grams of the silica particles with attached couplers and 25 grams of Levafix Brilliant Blue EFFA (available from Bayer) in 100 milliliters of water was stirred at room temperature for 24 hours in a round bottom flask equipped with a magnetic stirrer.

The reaction mixture was purified by ultrafiltration with a Minitan Acrylic System from Millipore Inc. until the supernatant was colorless. The suspension was then concentrated to 100 milliliters and freeze-dried with a Dura-Dry ™ freeze dryer, available from FTS ® Systems, Stone Ridge, N.Y., to yield 23 grams of blue silica particles.

To 1.75 grams of ¼ inch stainless steel balls in an Union Process O1 Attritor were then added 25 grams of Elvax II 5720 (available from E. I. DuPont) and 125 grams of Isopar ® L (available from Exxon Corporation). The attritor was heated to 115° C. under constant stirring. Thereafter, 10.0 grams of the above prepared cyan colored silica particles were added to the mixture. Dispersion was continued for 30 minutes, after which time a further 150 grams of Isopar ® L were added to the mixture. Attrition was continued for a further hour. The attritor was then cooled to 25° C. over a period of 2 hours and attrition was continued for an additional three hours at 25° C.

The resulting dispersion had a solids content of 11.3 percent by weight with an average particle diameter of 2.8 microns as measured with a Horiba centrifugal analyzer. The dispersion was then diluted to a particle concentration of 1.5 percent by weight by the addition of Isopar ® G (available from Exxon Corporation).

To 70 grams of the above dispersion was then added 1.0 milliliter of a 12 percent by weight mixture of OLOA 1200 (available from Chevron Chemical Co) in Isopar ® G as the charge director. The resulting liquid developer was allowed to equilibrate for 24 hours. Subsequent electrical measurements indicated that the developer was charged negatively with a charge to mass ratio of 110 microcoulombs per gram. The liquid developer was placed in a Savin 870 copier and images were formed and developed. The transfer efficiency of the liquid developer was 90 percent as measured gravimetrically, and the optical density of the solid image areas was 1.0 as measured with a Macbeth TR927 densitometer, with a resolution of 8 line pairs per millimeter.

EXAMPLE XXVII

A liquid developer was prepared as described in Example XXVI with the exception that 30 milligrams of lecithin (available from Fisher Scientific Company) per gram of silica material was used as the charge director in place of OLOA 1200. The resulting liquid developer was negatively charged and exhibited a charge to mass ratio of 110 microcoulombs per gram. When the liquid developer was incorporated into a Savin 870 copier and employed to develop images, prints with an optical density of 1.0 were obtained, which exhibited a resolution of 8 line pairs per millimeter.

EXAMPLE XXVIII

A liquid developer was prepared as described in Example XXVI with the exception that red colored silica particles as described in Example VIII replaced the cyan colored particles. The resulting liquid developer was negatively charged and exhibited a charge to mass ratio of 100 microcoulombs per gram. When the liquid developer was incorporated into a Savin 870 copier and employed to develop images, prints with an optical density of 1.05 were obtained. The transfer efficiency of the developer from the photoreceptor to the paper was 92 percent, as measured gravimetrically.

EXAMPLE XXIX

A liquid developer was prepared as described in Example XXVIII with the exception that 30 milligrams of lecithin (available from Fisher Scientific Company) per gram of silica material was used as the charge director in place of OLOA 1200. The resulting liquid developer was negatively charged and exhibited a charge to mass ratio of 120 microcoulombs per gram. When the liquid developer was incorporated into a Savin 870 copier and employed to develop images, prints with an optical density of 1.1 were obtained. The transfer efficiency of the developer from the photoreceptor to the paper was 93 percent, as measured gravimetrically.

Other embodiments and modifications of the present invention may occur to those skilled in the art subsequent to a review of the information presented herein; these embodiments and modifications, as well as equivalents thereof, are also included within the scope of this invention.

What is claimed is:

1. A liquid developer composition which comprises a liquid medium, a polymeric material soluble in the liquid medium, a charge control agent, and a plurality of colored particles consisting essentially of hydrophilic silica particles, to the surfaces of which dyes are covalently bonded through silane coupling agents, wherein the dyes are selected from the group consisting of anthraquinones, phthalocyanines, aza annulenes, formazan copper complexes, and triphenodioxazines, to which are covalently attached reactive groups.

2. A liquid developer according to claim 1 wherein the hydrophilic silica particles comprise fumed silica.

3. A liquid developer according to claim 1 wherein the hydrophilic silica particles are prepared by a sol-gel process.

4. A liquid developer according to claim 1 wherein the hydrophilic silica particles have a surface area of from about 50 to about 380 square meters per gram.

5. A liquid developer according to claim 1 wherein the silane coupling agent is selected from the group consisting of hydroxyalkyl silanes, aminoalkylsilanes, hydroxyalkylaryl silanes, aminoalkylaryl silanes, hydroxyaryl silanes, aminoaryl silanes, and mixtures thereof.

6. A liquid developer according to claim 1 wherein the coupling agent is selected from the group consisting of aminopropyltriethoxysilane, N,N-(2'hydroxyethyl)-3-aminopropyltriethoxysilane, 4-aminobutyltriethoxysilane, (aminoethyl)-(aminomethyl)-phenethyltrimethoxysilane, N-(2-aminoethyl)-3-aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and mixtures thereof.

7. A liquid developer according to claim 1 wherein the dye comprises a Reactive Dye.

8. A liquid developer according to claim 1 wherein the colored particles comprise from about 65 to about 98 percent by weight of silica, from about 1 to about 20 percent by weight of the coupling agent, and from about 1 to about 30 percent by weight of the dye.

9. A liquid developer according to claim 1 wherein the polymer is soluble in the liquid medium at temperatures of from about −20° C. to about 100° C.

10. A liquid developer according to claim 1 wherein the polymer is selected from the group consisting of poly(2-ethyl hexylmethacrylate); poly(isobutylene-coisoprenes); vinyl toluene acrylic copolymers; poly(styrene-b-hydrogenated butadiene); and mixtures thereof.

11. A liquid developer according to claim 1 wherein the charge control agent is selected from the group consisting of lecithin, polyisobutylene succinimide, basic barium petronate, zirconium octoate, aluminum stearate, iron naphthenate, and mixtures thereof.

12. A liquid developer according to claim 1 wherein the liquid medium comprises an aliphatic hydrocarbon.

13. A liquid developer according to claim 1 wherein the liquid medium is present in an amount of from about 75 to about 99.4 percent by weight, the polymer is present in an amount of from about 0.5 to about 15 percent by weight, the charge control agent is present in an amount of from about 0.001 to about 2 percent by weight, and the colored particles are present in an amount of from about 0.1 to about 8 percent by weight.

14. A process for generating images which comprises generating an electrostatic latent image on an imaging member, developing the latent image with the liquid developer of claim 1, and transferring the developed image to a substrate.

15. A process for generating images which comprises generating an electrostatic latent image on a substrate with an electrically insulating surface and developing the latent image with the liquid developer of claim 1.

16. A liquid developer composition which comprises a liquid medium, a polymeric material soluble in the liquid medium, a charge control agent, and a plurality of colored particles consisting, essentially of hydrophilic silica particles, to the surfaces of which dyes are covalently bonded through silane coupling agents, wherein the dye includes a reactive group selected from the group consisting of dichlorotriazines, monochlorotriazines, dichloroquinoxalines, aminoepoxides, mono-(m'-carboxypyridinium)-triazines, 2,4,5-trihalogenopyrimidines, 2,4-dichloropyrimidines, 2,3-dichloroquinoxalines, monofluorotriazines, 4,5-dichloro-6-methyl-2-methylsulfonylpyrimidines, 1,4-dichlorophthalazines, chlorobenzo-thiazoles, -sulfato-ethylsulfones, β-chloroethylsulfones, 4,5-dichloro-6-pyridazones, α-bromoacryloylamidos, and α,β-dibromopropionylamidos.

17. A liquid developer composition which comprises a liquid medium, a polymeric material soluble in the liquid medium, a charge control agent, and a plurality of colored particles consisting essentially of hydrophilic silica particles, to the surface of which dyes are covalently bonded through silane coupling agents, wherein the particles are prepared by a process which comprises reacting hydrophilic silica particles with a silane coupling agent in the absence of water to form particles having covalently attached thereto coupling agents, followed by reacting a dye with the coupling agent, wherein the dyes are selected from the group consisting of anthraquinones, phthalocyanines, azaannulenes, formazan copper complexes, and triphenodioxazines, to which are covalently attached reactive groups.

18. A liquid developer according to claim 17 wherein the hydrophilic silica particles comprise fumed silica.

19. A liquid developer according to claim 17 wherein the hydrophilic silica particles are prepared by a sol-gel process.

20. A process for preparing a liquid developer which comprises reacting hydrophilic silica particles with a silane coupling agent in the absence of water to form silica particles having covalently attached thereto coupling agents, subsequently reacting a dye with the coupling agent to form colored silica particles to the surface of which the dye is covalently bonded through the silane coupling agent, recovering and drying the colored silica particles, admixing the colored silica particles with a liquid medium and a polymeric material soluble in the liquid medium, and adding to the mixture a charge control agent, wherein the dyes are selected from the group consisting of anthraquinones, phthalocyanines, azaannulenes, formazan copper complexes, and triphenodioxazines, to which are covalently attached reactive groups.

21. A process according to claim 20 wherein the silane coupling agent is added to a solvent to form a solution, the hydrophilic silica particles are subsequently suspended in the solution, the resulting suspension is refluxed for from about 2 to about 24 hours, water is removed during the reflux process, and silica particles having covalently bound thereto the coupling agents are recovered from the suspension.

22. A process according to claim 21 wherein the coupling agent is added to the solvent in an amount of from about 0.1 to about 10 percent by weight.

23. A process according to claim 22 wherein the coupling agent is added to the solvent in an amount of from about 2 to about 5 percent by weight.

24. A process according to claim 21 wherein the hydrophilic silica particles are suspended in the solution in an amount of from about 0.1 to about 10 percent by weight.

25. A process according to claim 21 wherein the silica particles having covalently attached thereto coupling agents are suspended in water, the dye is added to the suspension, the resulting solution is stirred for from about 4 to about 48 hours, and colored silica particles to the surface of which the dye is covalently bonded through the silane coupling agent are recovered from the solution.

26. A process according to claim 25 wherein the silica particles having covalently attached thereto coupling agents are suspended in water in an amount of from about 0.1 to about 20 percent by weight.

27. A process according to claim 25 wherein the dye is added to the suspension in an amount of from about 0.5 to about 10 percent by weight.

28. A process according to claim 21 wherein the silane coupling agent is added to a solvent to form a solution containing the coupling agent in an amount of from about 0.1 to about 10 percent by weight, the hydrophilic silica particles are subsequently suspended in the solution in an amount of from about 0.1 to about 10 percent by weight, the resulting suspension is refluxed for from about 2 to about 24 hours, water is removed during the reflux process, silica particles having covalently bound thereto the coupling agents are recovered from the suspension, the silica particles having covalently attached thereto coupling agents are suspended in water in an amount of from about 0.1 to about 20 percent by weight, the dye is added to the suspension in an amount of from about 0.5 to about 10 percent by weight, the resulting solution is stirred for from about 4 to about 48 hours, and colored silica particles to the surface of which the dye is covalently bonded through the silane coupling agent are recovered from the solution.

29. A process according to claim 28 wherein the suspension of silica particles and coupling agent in the solvent is refluxed at a temperature of about 111° C.

30. A liquid developer composition which comprises a liquid medium, a charge control agent, and a plurality of colored particles comprising a resin insoluble in the liquid medium and hydrophilic silica particles, to the surface of which dyes are covalently bonded through silane coupling agents, wherein the silica particles are prepared by a process which comprises reacting hydrophilic silica particles with a silane coupling agent in the absence of water to form particles having covalently attached thereto coupling agents, followed by reacting a dye with the coupling agent, and wherein the dyes are selected from the group consisting of anthraquinones, phthalocyanines, azaannulenes, formazan copper complexes, and triphenodioxazines, to which are covalently attached reactive groups.

31. A liquid developer according to claim 30 wherein the hydrophilic silica particles comprise fumed silica.

32. A liquid developer according to claim 30 wherein the hydrophilic silica particles are prepared by a sol-gel process.

33. A process for preparing a liquid developer which comprises reacting hydrophilic silica particles with a silane coupling agent in the absence of water to form silica particles having covalently attached thereto coupling agents, subsequently reacting a dye with the coupling agent to form colored silica particles to the surface of which the dye is covalently bonded through the silane coupling agent, recovering and drying the colored silica particles, admixing a liquid medium and a resin insoluble in the liquid medium, admixing the colored silica particles with the liquid medium and resin, and adding to the mixture a charge control agent, wherein the dyes are selected from the group consisting of anthraquinones, phthalocyanines, azaannulenes, formazan copper complexes, and triphenodioxazines, to which are covalently attached reactive groups.

34. A liquid developer composition which comprises a liquid medium, a charge control agent, and a plurality of toner particles comprising a resin and colored hydrophilic silica particles, to the surfaces of which silica particles dyes are covalently bonded through silane coupling agents, wherein the dyes are selected from the group consisting of anthraquinones, phthalocyanines, azaannulenes, formazan copper complexes, and triphenodioxazines, to which are covalently attached reactive groups.

35. A liquid developer according to claim 34 wherein the hydrophilic silica particles comprise fumed silica.

36. A liquid developer according to claim 34 wherein the hydrophilic silica particles are prepared by a sol-gel process.

37. A liquid developer according to claim 34 wherein the hydrophilic silica particles have a surface area of from about 50 to about 380 square meters per gram.

38. A liquid developer according to claim 34 wherein the silane coupling agent is selected from the group consisting of hydroxyalkyl silanes, aminoalkylsilanes, hydroxyalkylaryl silanes, aminoalkylaryl silanes, hydroxyaryl silanes, aminoaryl silanes, and mixtures thereof.

39. A liquid developer according to claim 34 wherein the coupling agent is selected from the group consisting of aminopropyltriethoxysilane, N,N-(2'hydroxyethyl)-3-aminopropyltriethoxysilane, 4-aminobutyltriethoxysilane, (aminoethyl)-(aminomethyl)phenethyltrimethoxysilane, N-(2-aminoethyl)-3aminopropyltrimethoxysilane, p-aminophenyltriethoxysilane, N-(2-aminoethyl)-3-aminopropylmethyldimethoxysilane, 3-aminopropyltrimethoxysilane, 3-aminopropylmethyldimethoxysilane, and mixtures thereof.

40. A liquid developer according to claim 34 wherein the dye comprises a Reactive Dye.

41. A liquid developer according to claim 34 wherein the dye includes a reactive group selected from the group consisting of dichlorotriazines, monochlorotriazines, dichloroquinoxalines, aminoepoxides, mono-(m'-carboxypyridinium)-triazines, 2,4,5-trihalogenopyrimidines, 2,4-dichloropyrimidines, 2,3-dichloroquinoxalines, monofluorotriazines, 4,5-dichloro-6-methyl-2-methylsulfonylpyrimidines, 1,4-dichlorophthalazines, chlorobenzo-thiazoles, sulfatoethylsulfones, $\beta$-chloroethylsulfones, 4,5-dichloro-6-pyridazones, $\alpha$-bromoacryloylamidos, and $\alpha,\beta$-dibromopropionylamidos.

42. A liquid developer according to claim 34 wherein the colored particles comprise from about 65 to about 98 percent by weight of silica, from about 1 to about 20 percent by weight of the coupling agent, and from about 1 to about 30 percent by weight of the dye.

43. A liquid developer according to claim 34 wherein the resin is insoluble in the liquid medium at ambient temperature.

44. A liquid developer according to claim 34 wherein the resin is selected from the group consisting of copolymers of ethylene and methacrylic acid, copolymers of ethylene and acrylic acid, copolymers of ethylene and vinyl acetate, methacrylate copolymers, polyolefins, halogenated polyolefins, and mixtures thereof.

45. A liquid developer according to claim 34 wherein the charge control agent is selected from the group consisting of lecithin, polyisobutylene succinimide, basic barium petronate, zirconium octoate, aluminum stearate, iron naphthenate, and mixtures thereof.

46. A liquid developer according to claim 34 wherein the liquid medium comprises an aliphatic hydrocarbon.

47. A liquid developer according to claim 34 wherein the liquid medium is present in an amount of from about 94 to about 99.6 percent by weight, the charge control agent is present in an amount of from about 0.01 to about 0.2 percent by weight, and the toner particles are present in an amount of from about 0.4 to about 6 percent by weight, wherein the toner particles comprise the resin in an amount of from about 65 to about 95 percent by weight and the colored silica particles in annn amount of from about 5 to about 35 percent by weight.

48. A process for generating images which comprises generating an electrostatic latent image on an imaging member, developing the latent image with the liquid developer of claim 34, and transferring the developed image to a substrate.

* * * * *

UNITED STATES PATENT AND TRADEMARK OFFICE
CERTIFICATE OF CORRECTION

PATENT NO. : 5,378,574
DATED : January 3, 1995
INVENTOR(S) : Winnik et al.

It is certified that error appears in the above-indentified patent and that said Letters Patent is hereby corrected as shown below:

On the title page, item [75], change Inventor's name from "Melvin D. Crocher" to read --Melvin D. Croucher--.

Signed and Sealed this

Third Day of October, 1995

Attest:

BRUCE LEHMAN

*Attesting Officer*     *Commissioner of Patents and Trademarks*